(12) United States Patent
Jin et al.

(10) Patent No.: US 9,910,919 B2
(45) Date of Patent: Mar. 6, 2018

(54) CONTENT PROCESSING DEVICE AND METHOD FOR TRANSMITTING SEGMENT OF VARIABLE SIZE, AND COMPUTER-READABLE RECORDING MEDIUM

(71) Applicant: SAMSUNG ELECTRONICS CO., LTD., Suwon-si, Gyeonggi-do (KR)

(72) Inventors: Jang-ho Jin, Hwaseong-si (KR); Young-jun Ryu, Suwon-si (KR); Myung-suk Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 14/924,235

(22) Filed: Oct. 27, 2015

(65) Prior Publication Data
US 2016/0140224 A1    May 19, 2016

(30) Foreign Application Priority Data
Nov. 18, 2014   (KR) .................. 10-2014-0160581

(51) Int. Cl.
| G06F 17/00 | (2006.01) |
| G06F 17/30 | (2006.01) |
| H04N 21/439 | (2011.01) |
| H04N 21/845 | (2011.01) |

(52) U.S. Cl.
CPC .. *G06F 17/30758* (2013.01); *G06F 17/30743* (2013.01); *G10H 2210/046* (2013.01); *G10H 2210/061* (2013.01); *G10H 2220/011* (2013.01); *G10H 2240/141* (2013.01); *H04N 21/4394* (2013.01); *H04N 21/8456* (2013.01)

(58) Field of Classification Search
CPC ................................................ G06F 17/30758
See application file for complete search history.

(56) References Cited

U.S. PATENT DOCUMENTS

| 8,490,131 B2 | 7/2013 | Sugiyama et al. |
| 2005/0126369 A1 | 6/2005 | Kirkeby et al. |
| 2007/0127735 A1 | 6/2007 | Miura et al. |
| 2008/0235741 A1 | 9/2008 | Ljolje et al. |

(Continued)

FOREIGN PATENT DOCUMENTS

JP    3488626    1/2004

OTHER PUBLICATIONS

Coover et al. "A Power Mask Based Audio Fingerprint", IEEE International Conference on Acoustic, Speech, and Signal Processing (ICASSP), 2014, Gracenote, Emeryville, CA, 5 pages.

(Continued)

*Primary Examiner* — Joseph Saunders, Jr.
(74) *Attorney, Agent, or Firm* — Staas & Halsey LLP

(57) ABSTRACT

A content processing device is provided. The content processing device includes a receiver configured to receive a content, an audio processor configured to extract an audio signal by decoding audio data included in the content, a processor configured to determine a characteristic section in the audio signal based on a ratio of music information of the audio signal, and detect a segment corresponding to the characteristic section in the audio signal; and a communicator configured to transmit the segment to a music recognition server, and a size of the segment is determined variably within a threshold range.

19 Claims, 20 Drawing Sheets

(56) References Cited

U.S. PATENT DOCUMENTS

2013/0318071 A1* 11/2013 Cho .................. G06F 17/3074
707/722
2014/0040088 A1 2/2014 King et al.
2014/0330854 A1* 11/2014 Samari ............. G06F 17/30551
707/758
2015/0332667 A1* 11/2015 Mason .................. G10L 15/02
704/249

OTHER PUBLICATIONS

Wikipedia contributors, "Signal-to-noise ration", Wikipedia, the Free Encyclopedia, Mar. 31, 2016, from https://en.wikipedia.org/w/index.php?title=Signal-to-noise_ratio&oldid=724548607, 5 pages.

Extended European Search Report dated Apr. 11, 2016 in corresponding European Patent Application No. 15194606.8.

International Search Report and Written Opinion dated Mar. 31, 2016 in corresponding International Patent Application No. PCT/KR2015/011115.

* cited by examiner

FIG. 5

| Segment #1 | Start Point | End Point | Type | Confidence | PCM Data |
| --- | --- | --- | --- | --- | --- |
| Segment #2 | Start Point | End Point | Type | Confidence | PCM Data |

|  | Start Point | End Point | SNR |  |
|---|---|---|---|---|
| Segment 1 | 3 | 10 | 8 | |
| Segment 2 | 12 | 17 | 5 | |
| Segment 3 | 21 | 24 | 6 | 1st Group |
| Segment 4 | 28 | 33 | 7 | |
| Segment 5 | 35 | 44 | 10 | |

|  | Start Point | End Point | SNR |  |
|---|---|---|---|---|
| Segment 6 | 46 | 49 | 6 | |
| Segment 7 | 52 | 55 | 7 | |
| Segment 8 | 57 | 61 | 9 | 2nd Group |
| Segment 9 | 66 | 70 | 10 | |
| Segment 10 | 72 | 82 | 8 | |

FIG. 9

|  | Start Point | End Point | SNR | Priority |
|---|---|---|---|---|
| Segment 1 | 3 | 10 | 8 | 2 |
| Segment 2 | 12 | 17 | 5 | 5 |
| Segment 3 | 21 | 24 | 6 | 4 |
| Segment 4 | 28 | 33 | 7 | 3 |
| Segment 5 | 35 | 44 | 10 | 1 |

FIG. 10

|  | Start Point | End Point | SNR | Priority |
|---|---|---|---|---|
| Segment 1 | 3 | 10 | 8 | 2 |
| Segment 2 | 12 | 17 | 5 | 5 |
| Segment 3 | 21 | 24 | 6 | 4 |
| Segment 4 | 28 | 33 | 7 | 3 |
| Segment 5 | 35 | 44 | 10 | 1 |

|  | Start Point | End Point | SNR | Priority |
|---|---|---|---|---|
| Segment 6 | 46 | 49 | 6 | 5 |
| Segment 7 | 52 | 55 | 7 | 4 |
| Segment 8 | 57 | 61 | 9 | 2 |
| Segment 9 | 66 | 70 | 10 | 1 |
| Segment 10 | 72 | 82 | 8 | 3 |

⋮

300

CONTENT PROCESSING DEVICE AND METHOD FOR TRANSMITTING SEGMENT OF VARIABLE SIZE, AND COMPUTER-READABLE RECORDING MEDIUM

CROSS-REFERENCE TO RELATED APPLICATIONS

This application claims priority from Korean Patent Application No. 10-2014-0160581, filed on Nov. 18, 2014, in the Korean Intellectual Property Office, the disclosure of which is incorporated herein by reference in its entirety.

BACKGROUND

1. Field

Apparatuses and methods consistent with the present disclosure relate to a content processing device and a method for transmitting a segment thereof, and more particularly, to a content processing device which generates a segment of a variable size in an audio signal included in a content for recognizing music, and transmits the segment, and a method for transmitting a segment thereof.

2. Description of the Related Art

A multimedia content may be divided into a video stream and an audio stream. The audio stream may be regarded as audio data combining music, speech, and other components.

In order to search music information included in the audio stream, a music search device transmits the audio data to a recognition server, and the recognition server analyzes the frequency characteristic of the audio and finds the music information. The searched music information may be transmitted to the music search device and provided to a user. In general, the stream of a content may be regarded as audio data in which music, speech, and other noise components are mixed. Among these, a music section to be searched may be determined depending on user's selection or a section divided by equipment. Specifically, in the former method, the user determines the start and the end of the section by manipulating equipment while music is being replayed. However, this method has a problem that, if the user selects an exact section, it is difficult for the user to search the section as the user desires. In addition, if the section selected by the user is long, as much network traffic as audio data may be generated.

In the latter method, the equipment monitors the audio stream in real time, analyzes the characteristic, separates a music section from the audio stream, and then transmits audio data of this section to a server. In this case, the performance of recognition may be influenced by the characteristic of the audio section.

The accuracy of the result of recognition and the amount of system resources consumed and network traffic depend on how the audio section is divided.

That is, the size of audio section data to be transmitted to the server determines the amount of network traffic. Therefore, if the audio section data is transmitted to the server as it is after the music section is divided by a client device, data cost increases due to the excessive amount of traffic and resources such as a CPU or a battery of the device are consumed.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a content processing device which generates a segment of a variable size in an audio signal included in a content for recognizing music, and transmits the segment, a method for transmitting a segment thereof, and a computer program recorded on a recording medium.

According to an aspect of the present disclosure, a content processing device includes a receiver configured to receive a content; an audio processor configured to extract an audio signal by decoding audio data included in the content; a processor configured to determine a characteristic section in the audio signal based on a ratio of music information of the audio signal, and detect a segment corresponding to the characteristic section in the audio signal; and a communicator configured to transmit the segment to a music recognition server, and a size of the segment is determined variably within a threshold range.

The processor may be configured to calculate the ratio of the music in the audio signal, determine, as the characteristic section, at least one audio section in which the ratio of the music in the audio signal is greater than or equal to a threshold value, and generate the segment by labeling the characteristic section with a start point and an end point.

The processor may be configured to, in response to the size of the segment being less than the threshold range, combine the segment with a neighboring segment, and, in response to the size of the segment exceeding the threshold range, divide the segment into a plurality of pieces.

In response to a plurality of segments being detected, the processor may be configured to group a number of segments among the plurality of segments and control the communicator to transmit the grouped segments to the music recognition server in phases (an order).

After having transmitted one segment group to the music recognition server, in response to a music recognition failure signal being received from the music recognition server through the communicator, the processor may be configured to transmit a segment subsequent to one of the segment groups transmitted to the music recognitions server, and, in response to a music recognition completion signal being received from the music recognition server, not to transmit the subsequent segment group.

The content processing device may further include a storage configured to, in response to music information being recognized according to the segment by the music recognition server, store the music information, and a display configured to display the music information.

In response to a plurality of segments being detected, the processor may be configured to allocate priority to the plurality of segments in order of the ratio of the music information in the audio signal, and transmit the plurality of segments to the music recognition server in sequence according to the priority.

The processor may be configured to allocate the priority to the plurality of segments in response to the plurality of segments reaching a predetermined number.

The ratio of the music in the audio signal is calculated by the following formula:

Ratio of music in the audio signal=music score/(noise score+speech score+other scores)

According to another aspect of the present disclosure, a method for transmitting a segment of a content processing device includes receiving a content; extracting an audio signal by decoding audio data included in the content; determining a characteristic section in the audio signal based on a ratio of music information of the audio signal, and detecting a segment corresponding to the characteristic section in the audio signal; and transmitting the segment to a music recognition server, wherein a size of the segment is determined variably within a threshold range.

The generating the segment may include calculating the ratio of the music in the audio signal, determining, as the characteristic section, at least one audio section in which the ratio of the music in the audio signal is greater than or equal to a threshold value, and generating the segment by labeling the characteristic section with a start point and an end point.

The method may further include, in response to the size of the segment being less than the threshold range, combining the segment with a neighboring segment, and, in response to the size of the segment exceeding the threshold range, dividing the segment into a plurality of pieces.

The transmitting the segment to the music recognition server may include, in response to a plurality of segments being detected, grouping a number of segments among the plurality of segments and transmitting the grouped segments to the music recognition server in phases (an order).

The transmitting the segment to the music recognition server may include, after having transmitted one segment group to the music recognition server, in response to a music recognition failure signal being received from the music recognition server, transmitting a segment group subsequent to the one of the segment groups to the music recognitions server, and, in response to a music recognition completion signal being received from the music recognition server, not transmitting the segment group subsequent to the one of the segment groups.

The method may further include, in response to music information being recognized by the segment transmitted from the music recognition server, storing the music information; and displaying the music information.

The method may further include, in response to a plurality of segments being detected, allocating priority to the plurality of segments in order of the ratio of the music information in the audio signal, and the transmitting may include transmitting the plurality of segments to the music recognition server in sequence according to the priority.

The allocating the priority may include allocating the priority to the detected segments in response to the plurality of segments reaching a predetermined number.

The ratio of the music in the audio signal is calculated by the following formula:

$$\text{Ratio of music in the audio signal} = \text{music score}/(\text{noise score} + \text{speech score} + \text{other scores})$$

According to another aspect of the present disclosure, a non-transitory computer readable medium which includes a program for executing a content processing method, including: receiving a content; extracting an audio signal by decoding audio data included in the content; determining a characteristic section in the audio signal based on a ratio of music information of the audio signal, and detecting a segment according to the characteristic section in the audio signal; and transmitting the segment to a music recognition server, wherein a size of the segment is determined variably within a threshold range.

According to another aspect of the present disclosure, a content processing method includes generating at least one segment of an audio signal to have a variable size within a range, the at least one segment generated being determined to have characteristic of a ratio of music information relative to a remaining content of the audio signal; and transmitting the at least one segment of the variable size within the range so as to implement music recognition.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects of the present disclosure will be more apparent by describing certain exemplary embodiments of the present disclosure with reference to the accompanying drawings, in which:

FIG. 5 is a view showing a configuration of a segment according to an exemplary embodiment;

FIG. 8 is a view showing a method for grouping and rearranging segments according to an exemplary embodiment;

FIGS. 9 and 10 are views showing a method for allocating priority to segments according to an exemplary embodiment;

DETAILED DESCRIPTION

Figure 1:
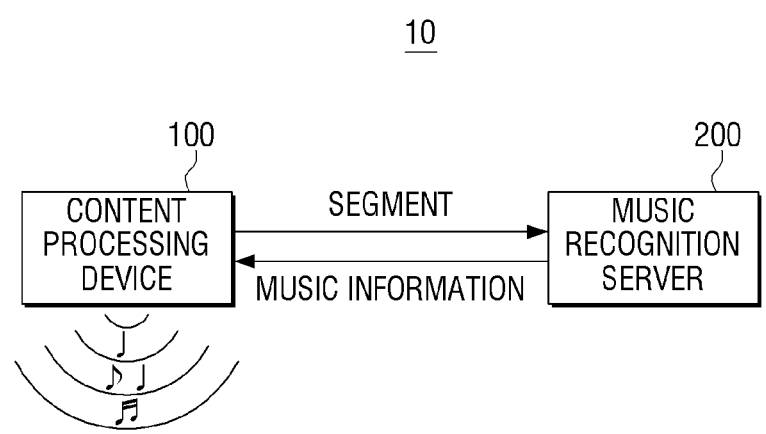
FIG. 1 is a view showing a music recognition system according to an exemplary embodiment.

Hereinafter, exemplary embodiments will be explained in detail with reference to the accompanying drawings, wherein like reference numerals refer to the like elements throughout. The embodiments are described below to explain the present invention by referring to the figures.

FIG. 1 is a view showing a music recognition system according to an exemplary embodiment. Referring to FIG. 1, the music recognition system 10 includes a content processing device 100 and a music recognition server 200.

When a content is reproduced, a user may need music information of currently reproduced music. The music information recited herein may include the title, album title, producer, composer, lyric writer, singer, replay time, release date, and other music information of music.

In order to provide music information to the user, the content processing device 100 determines a characteristic section in the audio signal of the currently reproduced content, generates a segment including the characteristic section, and transmits the segment to the music recognition server 200. In this case, the content processing device 100 may communicate with the music recognition server 200 through a network such as the Internet, a cable, or a satellite.

The content processing device 100 may refer to a device which is able to collect/reproduce audio streams through a network, broadcasting, or a microphone, such as a TV, a radio, a mobile phone, a computer, or an MP3 player. The detailed configuration and operation of the content processing device 100 will be explained in detail below with reference to FIG. 2.

In response to the segment being received, the music recognition server 200 analyzes the frequency characteristic of the audio of the segment and finds the music information. In response to music matching the segment being found, the music recognition server 200 transmits the music information to the content processing device 100.

The music recognition server 200 may be a server for providing a music recognition service to the user.

In response to the music information being received from the music recognition server 200, the content processing device 100 may provide the information to the user through a display.

Figure 2:
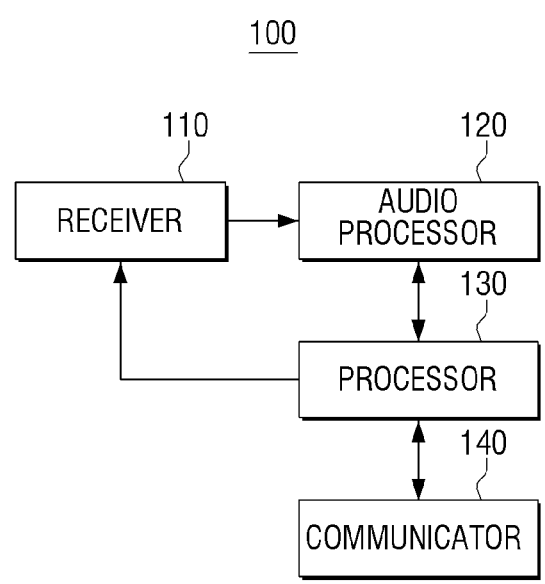
FIG. 2 is a block diagram showing a configuration of a content processing device according to an exemplary embodiment.

FIG. 2 is a block diagram showing a configuration of a content processing device according to an exemplary embodiment.

Referring to FIG. 2, the content processing device 100 includes a receiver 110, an audio processor 120, a processor 130, and a communicator 140.

The receiver 110 receives a content from a content provider. The content may be audio data or may include both video data and audio data. The content provider may be a public TV broadcasting station, a cable broadcasting station, an IPTV broadcasting station, a Vod system, etc. However, this should not be considered as limiting, and the content provider may further include a server or a system for providing a content including audio data.

The audio processor 120 decodes the audio data included in the broadcasting content and extracts an audio signal. In addition, the audio processor 120 may reproduce the decoded audio signal and output the audio signal through a speaker (not shown).

The processor 130 is an element which is responsible for controlling the device, and may be interchangeably used with a central processing device, a micro-processor, a controller, etc. The processor 130 is configured to control the overall operation of the device and may be combined with the audio processor 120, the communicator 140, or other functional parts to be implemented as a system on chip (SoC). Specifically, the processor 130 determines a characteristic section in the audio signal based on an SNR, and detects a segment including the characteristic section. More specifically, the processor 130 receives and stores the audio signal extracted by the audio processor 120 in the form of audio data (PCM), determines the characteristic section in the audio signal by analyzing the audio data based on the SNR, and detects the segment including the characteristic section.

In this case, the size of the segment may vary within a predetermined threshold range. The SNR recited herein refers to a ratio of music occupying the audio signal, and a detailed calculating method thereof will be explained below with reference to FIG. 4.

In addition, the processor 130 may calculate the SNR of the audio signal, determine, as the characteristic section, at least one audio section in which the SNR is greater than or equal to a predetermined threshold value, and generate the segment by labeling the characteristic section with a start point and an end point.

Specifically, the processor 130 may receive and store the audio signal extracted by the audio processor in the form of audio data (PCM), determine, as the characteristic section, the section in which the SNR of the audio signal is greater than or equal to the predetermined threshold, by analyzing the audio data based on the SNR, and detect the segment of the audio data corresponding to this section.

In addition, since the processor 130 generates the segment by labeling the characteristic section with the start point and the end point, the processor 130 may measure the size of the segment using information on the start point and the end point.

In addition, when the size of the segment is less than a threshold range, the processor 130 may combine the segment with a neighboring segment, and, when the size of the segment exceeds the threshold range, the processor 130 may divide the segment into a plurality of pieces.

Specifically, the processor 130 may measure the size of the segment using the start point and the end point labeled for the segment, and may compare the measured size of the segment and the threshold range. When the size of the segment is less than the threshold range, the processor 130 may combine the segment with a neighboring segment such that the size of the segment falls within the threshold range, and, when the size of the segment exceeds the threshold range, the processor 130 may divide the segment into a plurality of pieces such that the size of the segment falls within the threshold range.

The threshold range recited herein is from a minimum threshold value to a maximum threshold value inclusive. The minimum threshold value refers to a minimum size of a segment that can be recognized by the music recognition server, and the maximum threshold value refers to a limit size of a segment that can prevent waste of network traffic and resources. The method for combining and dividing the segment will be explained in detail below with reference to FIGS. 7A and 7B.

When a plurality of segments are generated, the processor 130 may allocate priority to the plurality of segments in order of the SNR, and transmit the plurality of segments to the music recognition server in sequence according to the priority through the communicator 140.

Specifically, the processor 130 may generate segments each of which has a characteristic section labeled with a confidence score, calculate the SNR of each of the segments using the confidence score, rearrange the segments in order of the SNR, and transmit the segments to the music recognition server through the communicator 140.

The confidence score recited herein refers to the size of each of the music, noise, speech, and other signals, which is calculated as the score of each of the music, noise, speech, and other signals. That is, the confidence score may determine characteristic vectors such as Mel Frequency Cepstral Coefficient (MFCC), Linear Predictive Coding (LPC), Zero-cross, pitch, etc. in the inputted audio signal, assign these characteristic vectors to a probabilistic model such as a Gaussian Mixture Model (GMM), a Hidden Markov Model (HMM), etc., and calculate a probability value for each of the music, noise, speech, and other signals.

In addition, the SNR of each of the segments may be calculated by the following formula using the confidence scores:

$$SNR = \text{music score}/(\text{noise score} + \text{speech score} + \text{other scores})$$

When a vocal signal is included in the audio along with music, the vocal signal is classified as a speech and used to calculate the SNR.

In this case, when as many segments as a predetermined number are generated, the processor 130 may allocate priority to the generated segments.

Specifically, when music is continuously reproduced, segments may be continuously generated. In this case, when as many segments as a predetermined number are generated even before the reproduction of the music is completed, the processor 130 may allocate priority only to the generated segments.

For example, 30 segments in total may be generated while music is continuously generated. In this case, when a predetermined number of segments, ten segments, are generated, the processor 130 may allocate priority to the ten segments in order of the SNR, rearrange the segments, and transmit the segments to the music recognition server.

The processor 130 controls the communicator 140 to transmit the segment to the music recognition server. Specifically, in response to the processor 130 determining the characteristic section in the audio signal based on the SNR and detecting the segment including the characteristic section, the processor 130 may transmit the segment to the music recognition server through the communicator 140.

In addition, when a plurality of segments are generated, the processor 130 may group the segments on a basis of a predetermined number basis, and control the communicator 140 to transmit the segments to the music recognition server on a group basis in phases.

Specifically, the processor 130 may transmit the segments to the music recognition server one by one in sequence. However, the processor 130 may group the plurality of segments and transmit the grouped segments to the music recognition server. For example, when the predetermined number is five, and five segments are generated, the processor 130 may group the five segments and transmits the 5 segments to the music recognition server, and then, when 5 subsequent segments are generated, the processor 130 may group the 5 subsequent segments and transmits the segments to the music recognition server. In this way, the processor 130 may transmit the segments on the group basis in phases.

In this case, in response to a music recognition failure signal being received from the music recognition server through the communicator 140 after having transmitted one segment group to the music recognition server, the processor 130 may transmit the subsequent segment group to the music recognition server. For example, the processor 130 may group the five segments and transmit the grouped segments to the music recognition server, and may wait without transmitting the subsequent group of the five segments. Then, in response to the music recognition failure signal being received from the music recognition server, the processor 130 may transmit the subsequent group of the five segments to the music recognition server.

In addition, in response to a music recognition completion signal being received from the music recognition server through the communicator 140 after having transmitted one segment group to the music recognition server, the processor 130 may not transmit the subsequent segment group. For example, the processor 130 may group the five segments and transmit the grouped segments to the music recognition server, and may wait without transmitting the subsequent group of the five segments. Then, in response to the music recognition completion signal or music information on the recognized music being received from the music recognition server, the processor 130 may not transmit the subsequent group of the five segments to the music recognition server. The music recognition completion signal recited herein may be a signal informing that the music recognition server 200 has recognized the music, and the processor 130 may interpret the music information on the recognized music as the music recognition completion signal.

In response to the music information of the music recognized by the segment being transmitted from the music recognition server, the processor 130 may control to store the music information. Specifically, in response to the music information of the music recognized by the segment being transmitted from the music recognition server, the processor 130 may list the music information and store the music information in a storage (not shown).

The processor 130 may control to display the music information on a display (not shown). Specifically, in response to the music information of the music recognized by the segment being transmitted from the music recognition server through the communicator 140, the processor 130 may list the music information and store the music information in the storage (not shown), and may control to display the stored music information on the display (not shown) automatically or in response to a user manipulation.

The communicator 140 is responsible for communicating with the music recognition server 200. The communicator 140 may communicate with the music recognition server through a network such as the Internet, a cable, a satellite, etc.

Figure 3:
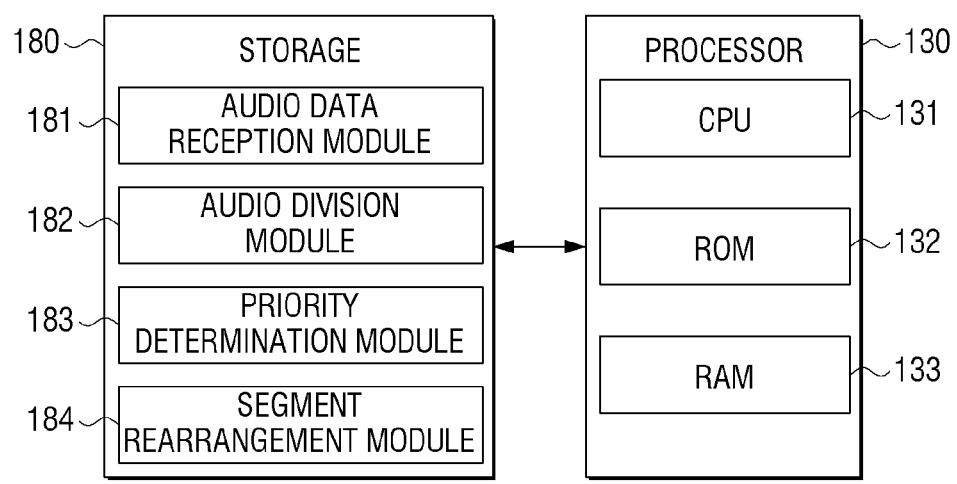
FIG. 3 is a view showing a software configuration of a content processing device according to an exemplary embodiment.

FIG. 3 is a view showing a software configuration of a content processing device according to an exemplary embodiment.

The processor 130 may include a Central Processing Unit (CPU) 131, a Read Only Memory (ROM) 132 in which a control program for controlling the content processing device 100 is stored, and a Random Access Memory (RAM) 133 which is used as a memory area for jobs performed in the content processing device 100.

The storage 180 may include various software modules such as an audio data reception module 181, an audio section division module 182, a priority determination module 183, a segment rearrangement module 184, etc.

The audio data reception module 181 may receive and store an audio signal which is extracted by the audio processor 120 in the form of audio data (PCM). In this case, the received audio data may be stored in the storage 180 of the content processing device 100.

The audio section division module 182 may determine a characteristic section based on an SNR and generate a segment including the characteristic section from the audio data.

Specifically, the audio section division module 182 may determine, as the characteristic section, the section in which the SNR of the audio signal is greater than or equal to a predetermined threshold value, by analyzing the audio data based on the SNR, and detect the segment of the audio data corresponding to this section.

In this case, the audio section division module 182 may determine the size of the segment variably within a predetermined threshold range. In addition, since the audio section division module 182 generates the segment by labeling the characteristic section with the start point and the end point, the audio section division module 182 may measure the size of the segment using information on the start point and the end point.

In addition, the audio section division module 182 may label with a confidence score (a music score, a noise score, a speech score, and other scores), and may label with a type of segment (pure music, music+voice/noise/speech) by analyzing the confidence score.

The audio section division module 182 may calculate the SNR by the following formula:

$$SNR=\text{music score}/(\text{noise score}+\text{speech score}+\text{other scores})$$

The priority determination module 183 may measure the size of the segment using the start point and the end point labeled for the segment, and may compare the measured size of the segment and a threshold range. When the size of the segment is less than the threshold range, the priority determination module 183 may combine the segment with a neighboring segment such that the size of the segment falls within the threshold range, and, when the size of the segment exceeds the threshold range the priority determination module 183 may divide the segment into a plurality of pieces such that the size of the segment falls within the threshold range.

In addition, when a plurality of segments are generated, the priority determination module 183 may allocate priority to the plurality of segments in order of the SNR. Specifically, the priority determination module 183 may calculate the SNR of each of the segments using the confidence score labeled for the segment, and allocate the priority in order of the SNR.

In addition, when as many segments as a predetermined number are generated, the priority determination module 183 may allocate priority to the generated segments. Specifically, when music is continuously reproduced, segments may be continuously generated. In this case, when as many segments as a predetermined number are generated even before the reproduction of the music is completed, the priority determination module 183 may allocate priority only to the generated segments.

When the plurality of segments are generated, the segment rearrangement module 184 may rearrange the segments in order to transmit the segments to the server according to the priority. In this case, the segment rearrangement module 184 may group the segments on a basis of a predetermined number and control the communicator 140 to transmit the segments to the music recognition server on a group basis in phases. That is, the segment rearrangement module 184 may transmit the segments to the music recognition server one by one in sequence, or may group the plurality of segments and transmit the segments to the music recognition server on the group basis.

In this case, the segment rearrangement module 184 may transmit one segment group to the music recognition server, and then, in response to a music recognition failure signal being received from the music recognition server through the communicator 140, may transmit a subsequent segment group to the music recognition server.

In addition, the segment rearrangement module 184 may transmit one segment group to the music recognition server, and then, in response to a music recognition completion signal or music information being received from the music recognition server through the communicator 140, may not transmit a subsequent segment group to the music recognition server.

Figure 4:
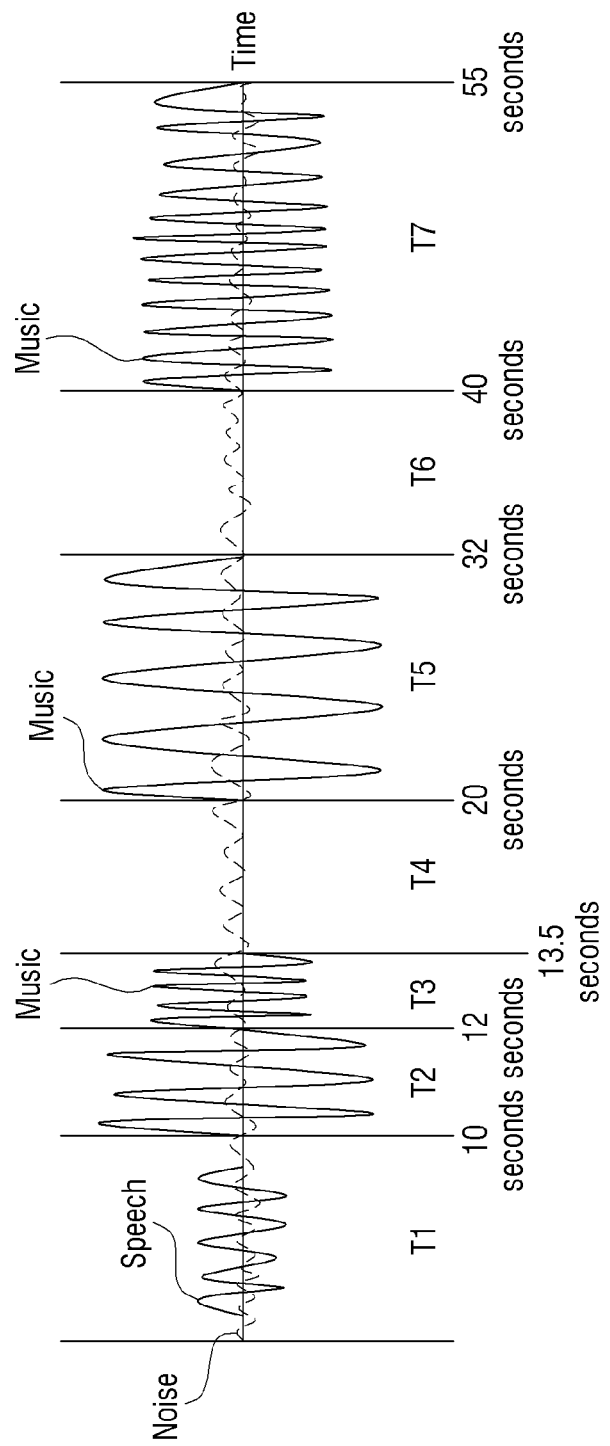
FIG. 4 is a view showing a method for generating a segment of audio data according to an exemplary embodiment.

FIG. 4 is a view showing a method for generating a segment of audio data according to an exemplary embodiment.

Referring to FIG. 4, the horizontal axis of the graph in FIG. 4 indicates reproduction time of an audio signal, and the vertical axis indicates the amplitude of noise, a speech, and a music signal. The processor 130 may calculate the music score, the noise score, the speech score, and other scores by monitoring the audio signal, and calculate the SNR by the following formula: SNR=music score/(noise score+speech score+other scores)

The processor 130 may calculate the SNR by the following formula:

$$SNR=\text{music score}/(\text{noise score}+\text{speech score}+\text{other scores})$$

In FIG. 4, section T1 is a section in which music is not included in the audio signal. That is, section T1 is a section in which a speech, noise, or other signals are included without music, and the SNR of this section is less than a predetermined threshold value. Accordingly, the processor 130 may not detect a segment in this section.

Section T2 is a section in which music is included in the audio signal. In this case, the size of the SNR exceeds the predetermined threshold value, and thus the processor 130 may determine section T2 as a characteristic section and generate a segment including this characteristic section. In addition, the processor 130 may label the segment with a start point (10 seconds), an end point (12 seconds), a type of audio (pure music), and confidence (a music score, a noise score, a speech score, and other scores).

Section T3 is a section in which music is included in the audio signal. In this case, the size of the SNR exceeds the predetermined threshold value, and thus the processor 130 may determine section T3 as a characteristic section and generate a segment including this characteristic section. In addition, the processor 130 may label the segment with a start point (12 seconds), an end point (13.5 seconds), a type of audio (music+vocal), and confidence (a music score, a noise score, a speech score, and other scores).

Section T4 is a section in which music is not included in the audio signal. That is, section T4 is a section in which noise or other signals are included without music, and the SNR of this section is less than the predetermined threshold value. Accordingly, the processor 130 may not detect a segment in this section.

In sections T5 and T7, segments may be generated in the same way as described above.

In the present exemplary embodiment, sections T2 and T3 have different SNRs and are illustrated as separate sections. However, since the SNR of section T2 and the SNR of section T3 exceed the predetermined threshold value, the processor 130 may regard sections T2 and T3 as a single section and detect the segment.

In addition, in the present exemplary embodiment, in sections T2, T3, T5, and T7 in which a music signal exists, the segments are detected. However, the segment may not be detected when a music signal exists, but the size of the other signals (speech, noise, and others) are relatively larger than the music signal and the SNR is less than the predetermined threshold value.

FIG. 5 is a view showing a configuration of a segment according to an exemplary embodiment. The segment includes audio data which is divided according to an SNR value, and is labeled with a start point, an end point, a type (pure music, music+voice/noise/speech), and confidence (a music score, a noise score, a speech score, and other scores).

Figure 6:
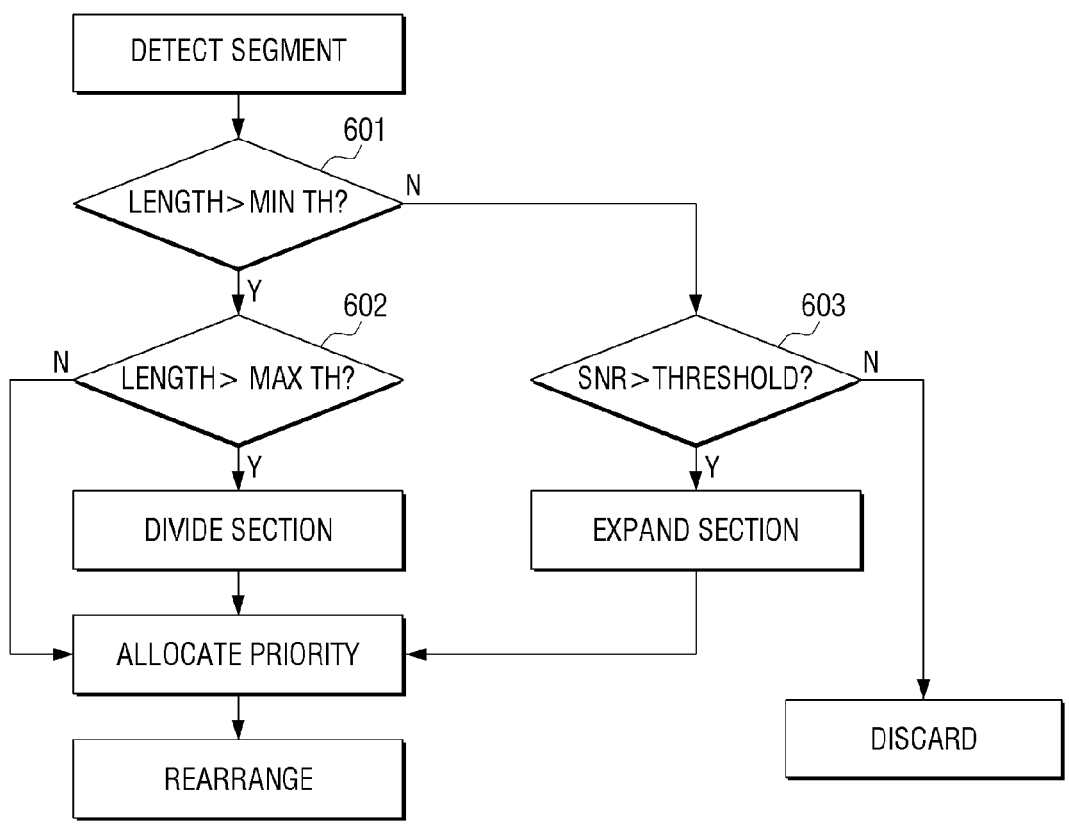
FIG. 6 is a view showing a method for allocating priority to segments according to an exemplary embodiment.

FIG. 6 is a view showing a method for allocating priority to segments according to an exemplary embodiment.

It is determined (or measured) whether the size of a segment is greater than or equal to a minimum threshold value or not (601).

In response to the size of the segment being determined to be greater than or equal to the minimum threshold value, it is determined whether the size of the segment is less than or equal to a maximum threshold value (602). In response to the size of the segment being determined to be less than or equal to the maxim threshold value, the segment may be allocated priority without being divided or combined.

However, in response to the size of the segment being determined to be greater than the maximum threshold value in step of 602, the segment may be divided using information on the start point and the end point of the segment such that the size of the segment is greater than or equal to the minimum threshold value and is less than or equal to the maximum threshold value, and may be allocated priority.

On the other hand, in response to the size of the segment being determined to be less than the minimum threshold value in step of 601, it is determined whether the SNR of the segment is greater than or equal to a predetermined threshold value or not (603).

In response to the SNR being determined to be greater than or equal to the predetermined threshold value, a new segment may be generated by combining the segment with a neighboring segment using the information on the start point and the end point of the segment, such that the size of the segment is greater than or equal to the minimum threshold value and less than or equal to the maximum threshold value. In this case, the new segment may be used to calculate priority of the segment.

However, in response to a size of the SNR of the segment being determined to be greater than or equal to the predetermined threshold value in step of 603, a section which the size of the segment is less than the minimum threshold value may not be used in music recognition and may be discarded.

Figure 7A:
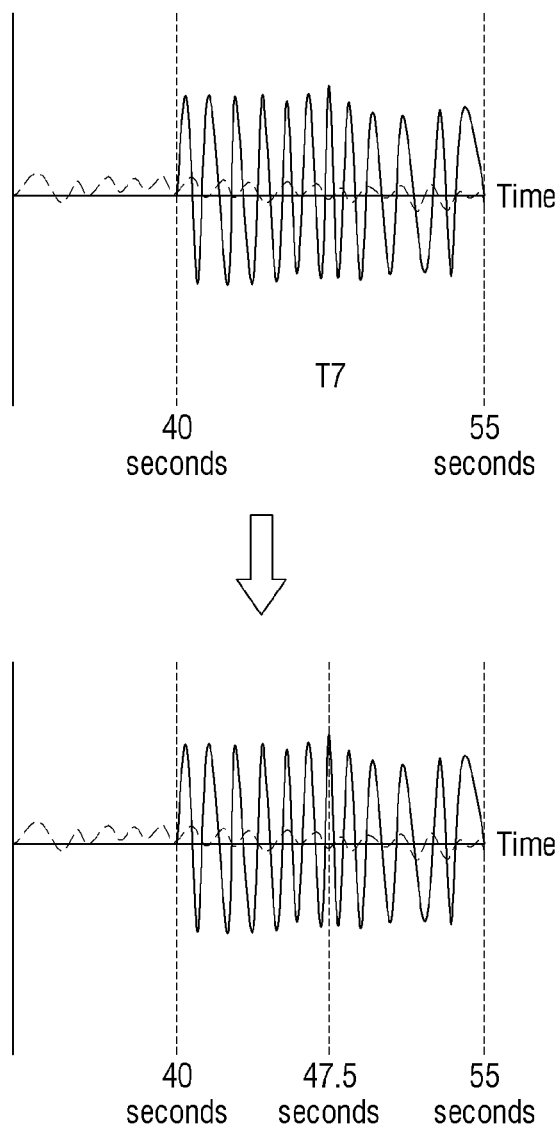
FIGS. 7A and 7B are views showing a method for combining and dividing a segment according to an exemplary embodiment.

FIG. 7A is a view showing a method for dividing a segment according to an exemplary embodiment.

Referring to FIG. 7A, on the assumption that the threshold range of the size of the segment is from 3 seconds to 10 seconds inclusive, it can be seen that the size of the segment in section T7 exceeds the maximum threshold value according to information on the start point and the end point of the section included in the segment.

That is, since the end point of the segment is 55 seconds and the start point of the segment is 40 seconds, the size of the segment is 15 seconds and thus exceeds the predetermined threshold range. Therefore, it is necessary to divide the segment to fall within the threshold range in order to prevent waste of network traffic and system resources.

Therefore, the processor 130 may divide the segment into segments each of which has the same size, that is, 7.5 seconds.

In the present exemplary embodiment, the segment is divided into segments each of which has the same size. However, this should not be considered as limiting. That is, the processor 130 may divide the segment into segments each of which has a size falling within the threshold range (3-10 seconds inclusive).

In addition, in the present exemplary embodiment, the segment in section T7 is divided into two segments. However, this should not be considered as limiting. For example, when the size of the initial segment is 30 seconds, the processor 130 may divide the initial segment into three segments to the minimum or ten segments to the maximum within the range satisfying the minimum threshold value of 3 seconds and the maximum threshold value of 10 seconds.

Figure 7B:
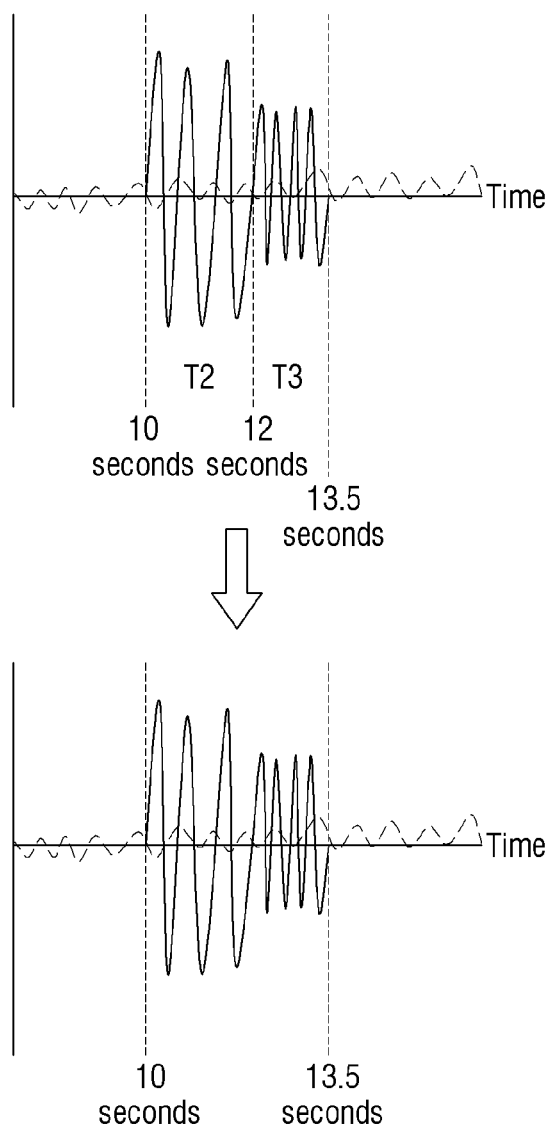

FIG. 7B is a view showing a method for combining segments according to an exemplary embodiment.

Referring to FIG. 7B, on the assumption that the threshold range of the size of the segment is from 3 seconds to 10 seconds inclusive, it can be seen that the size of the segment is less than the minimum threshold value according to information on the start point and the end point of the section included in the segment.

That is, since the start point of the segment in section T2 is 10 seconds and the end point is 12 seconds, the size of the segment is 2 seconds and thus is less than the minimum threshold value. In addition, since the start point of the segment in section T3 is 12 seconds and the end point is 13.5 seconds, the size of the segment is 1.5 seconds and thus is less than the minimum threshold value. Therefore, it is necessary to combine the segments to fall within the threshold range in order to guarantee the accuracy of a result of music recognition.

Therefore, the processor 130 may generate a segment of a size of 3.5 seconds satisfying a certain value within the threshold range (3 seconds to 10 seconds inclusive) by combining the segments.

In the present exemplary embodiment, the size of each of the segments to be combined is less than the minimum threshold value. However, this should not be considered as limiting. That is, when the size of one segment is less than the minimum threshold value, the segments may be combined regardless of whether the size of the other segment is greater than or equal to the minimum threshold value. However, in this case, the size of the segment after being combined should be a value within the threshold range.

In addition, in the present exemplary embodiment, the two segments are combined with each other. However, this should not be considered as limiting. That is, three or more segments may be combined such that the size of the segment after being combined is greater than or equal to the minimum threshold value.

In the present exemplary embodiment, the segments in sections T2 and T3 which are continuous in time are combined with each other. However, this should not be considered as limiting. For example, when sections T2 and T3 are not continuous in time and a section in which the SNR is less than or equal to a predetermined threshold value exists between sections T2 and T3, the segments in neighboring sections T2 and T3 may be combined with each other.

FIG. 8 is a view showing a method for grouping and rearranging segments according to an exemplary embodiment.

Referring to FIG. 8, when a plurality of segments are generated, the processor 130 may group the segments on a basis of a predetermined number and transmit the segments to the music recognition server on a group basis in phases.

Specifically, the processor 130 may transmit the segments to the music recognition server one by one in sequence, but may group the segments and transmit the grouped segments to the music recognition server.

For example, when the predetermined number is five and five segments are generated, the processor 130 groups the five segments to a first group and transmits the first group to the music recognition server. Then, when five more segments are generated, the processor 130 groups the five segments to a second group and transmits the second group to the music recognition server. In this way, the processor 130 may transmit the segments on the group basis in phases.

In this case, in response to a music recognition failure signal being received from the music recognition server 200 through the communicator 140 after having transmitted one segment group to the music recognition server, the processor 130 may transmit the subsequent segment group to the music recognition server 200.

For example, the processor 130 may transmit the segments of the first group to the music recognition server 200 and waits without transmitting the segments of the second group. Then, in response to the music recognition failure signal being received from the music recognition server, the processor 130 may transmit the segments of the second group to the music recognition server 200 through the communicator 140.

In addition, in response to a music recognition completion signal or music information of recognized music being received from the music recognition server 200 through the communicator 140 after having transmitted one segment group to the music recognition server, the processor 130 may not transmit the subsequent segment group.

For example, the processor 130 may transmit the segments of the first group to the music recognition server 200 and waits without transmitting the segments of the subsequent second group. Then, in response to the music recognition completion signal or the music information of the recognized music being received from the music recognition server 200 through the communicator 140, the processor 130 may not transmit the segments of the subsequent second group to the music recognition server 200.

In the present exemplary embodiment, the two segment groups exist. However, this should not be considered as limiting. That is, the segment groups may be transmitted in sequence until the music recognition is completed. In addition, in the present exemplary embodiment, the five segments are grouped to one segment group. However, this should not be considered as limiting.

FIG. 9 is a view showing a method for allocating priority to segments according to an exemplary embodiment.

Referring to FIG. 9, the segments are arranged in time order according to information on the start point and the end point of each of the segments, that is, in order of segment 1, segment 2, segment 3, segment 4, and segment 5.

In this case, the processor 130 may allocate priority to the segments according to the size of the SNR, and rearrange the segments according to the priority to transmit the segments to the music recognition server.

That is, the processor 130 may allocate priority to the segments according to the size of the SNR to transmit the segments in order of segment 5, segment 1, segment 4, segment 3, and segment 2.

As described above, when the plurality of segments are generated, the processor 130 may allocate priority to the plurality of segments in order of the SNR, and transmit the plurality of segments to the music recognition server in sequence according to the priority.

FIG. 10 is a view showing a method for allocating priority to segments according to an exemplary embodiment.

Referring to FIG. 10, when as many segments as a predetermined number are generated, the processor 130 may allocate priority to the generated segments.

Specifically, when music is continuously reproduced, segments may be continuously generated. In this case, when as many segments as a predetermined number are generated even before the reproduction of the music is completed, the processor 130 may allocate priority only to the generated segments.

For example, 30 segments in total may be generated while music is continuously generated. In this case, when the predetermined number is five and five segments are generated, the processor 130 may allocate priority to the five segments in order of the SNR, and transmit the segments to the music recognition server 200 in sequence according to the priority.

In the present exemplary embodiment, the segments are transmitted one by one. However, in the same method as explained in FIG. 8, the processor 130 may group the plurality of segments and transmit the grouped segments.

For example, when the predetermined number of segments for allocating priority to the segments is ten and the predetermined number for grouping the segments is two, the processor 130 allocates priority to the ten segments in order of the SNR, groups two segments to a group according to the priority, and transmits the segments to the music recognition server on the group basis.

Figure 11:
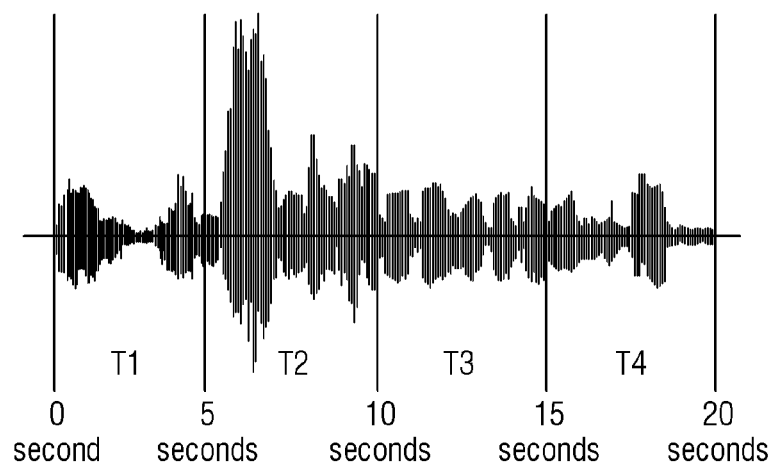
FIG. 11 is a view showing a method for dividing a segment at predetermined intervals according to an exemplary embodiment.

FIG. 11 is a view showing a method for dividing a segment at predetermined intervals according to an exemplary embodiment.

Referring to FIG. 11, the processor 130 may generate a segment of a predetermined size at predetermined intervals.

Specifically, the processor 130 may generate segments by dividing the section at regular intervals such that the size of each segment falls within a threshold range.

For example, when the threshold range is from 3 seconds to 10 seconds inclusive, the processor 130 may generate a segment of a predetermined size at regular intervals satisfying the range from 3 seconds to 10 seconds inclusive. In FIG. 11, the processor 130 generates a segment of a predetermined size at intervals of 5 seconds.

The processor 130 discards a segment when the SNR of the segments is less than or equal to a predetermined value.

In addition, when a plurality of segments are generated, the processor 130 may allocate priority to the plurality of segments in order of the SNR, and transmit the plurality of segments to the music recognition server in sequence according to the priority.

Specifically, the processor 130 may generate a segment having a characteristic section labeled with a confidence score, and calculate the SNR of each segment using the confidence score, rearrange the segments in order of the SNR, and transmit the segments to the music recognition server.

In addition, as described above in FIG. 8, when the plurality of segments are generated, the processor 130 may group the plurality of segments on the basis of the predetermined number and transmit the segments to the music recognition server on the group basis in phases.

In addition, as described above in FIG. 10, when as many segments as the predetermined number are generated, the processor 130 may allocate priority only to the generated segments and transmit the segments to the music recognition server.

Figure 12:
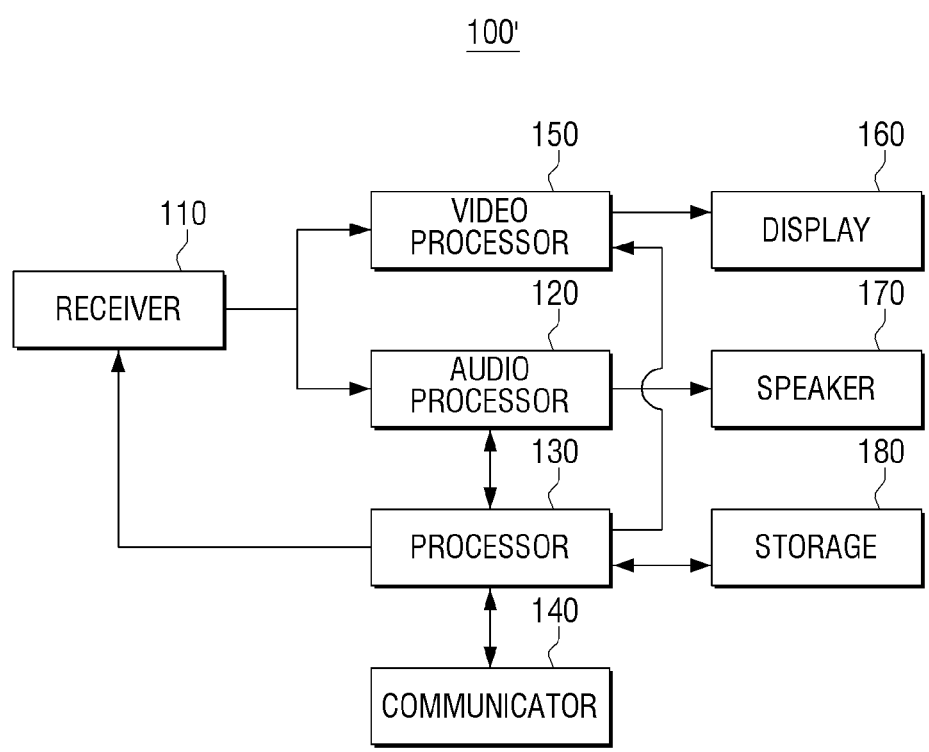
FIG. 12 is a block diagram showing a TV as an example of a content processing device according to an exemplary embodiment.

FIG. 12 is a block diagram showing a configuration of a TV as an example of a content processing device according to an exemplary embodiment.

Referring to FIG. 12, the content processing device 100 may further include a video processor 150, a display 160, a speaker 170, and a storage 180 in addition to the receiver 110, the audio processor 120, the processor 130, and the communicator 140.

The video processor 150 may perform signal processing, such as decoding and scaling with respect to image data of a broadcasting content.

The display 160 may display image data which is signal-processed by the video processor 150 on a screen.

In addition, the display 160 may display music information. Specifically, in response to music information of music recognized by the segment being received from the music recognition server through the communicator 140 and being stored in the storage 180, the display 160 may display the music information thereon and provide the music information to the user.

The speaker 170 may output audio data which is signal-processed by the audio processor 120. In addition, the speaker 170 may be controlled by the processor 130 to output music which is selected by the user from a music information list even after music recognition is completed.

The storage 180 may store the music information in response to the music information of the music recognized by the segment being received from the music recognition server. Specifically, the storage 180 may store the music information in response to the music information of the music recognized by the segment being transmitted from the music recognition server 200 through the communicator 140.

In addition, when a plurality of pieces of music information are received from the music recognition server 200, the storage 180 may list and store the music information.

In FIG. 12, the TV is illustrated by way of an example. However, this should not be considered as limiting. That is, the content processing device 100 may be any device which can collect/reproduce audio streams through a network, broadcasting, and a microphone, for example, a TV, a radio, a mobile phone, a computer, an MP3 player, or etc. When the content processing device 100 is implemented by using other kinds of devices, some elements may be omitted or changed. For example, when the content processing device 100 is a device which processes only audio streams, the video processor 150, the display 160, etc. may be omitted.

Figure 13A:
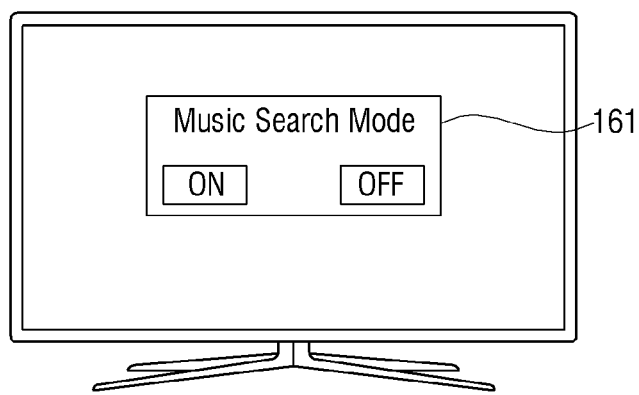
FIGS. 13A, 13B, 13C, 13D and 13E are views showing a music information display screen of a content processing device according to an exemplary embodiment.

FIG. 13A is a view showing a menu window through which a user turns on a music search mode.

Referring to FIG. 13A, the user may turn on the music search mode through the menu window 161 using various kinds of buttons provided on a certain area of a remote control device or the content processing device 100, such as a mechanical button, a touch pad, a wheel, etc.

The remote control device may be a device which can transmit control signals to the content processing device 100 using Wireless HDMI, Wi-Fi, Bluetooth, IR Blaster, IrDa, and may include a remote controller, a user terminal device, etc.

In response to user manipulation to turn on the music search mode, the processor 130 may receive and store an audio signal extracted by the audio processor 120 in the form of audio data (PCM), determine a characteristic section in the audio signal by analyzing audio data based on an SNR, and detect a segment including the characteristic section.

In the present exemplary embodiment, the menu window 161 is displayed to turn on the music search mode. However, this should not be considered as limiting. That is, the content processing device 100 may search music in response to only one-touch manipulation on the remote control device without providing the menu window 161. In addition, the content processing device 100 may search music automatically in response to the power of the TV being turned on according to user's settings without extra manipulation.

Figure 13B:
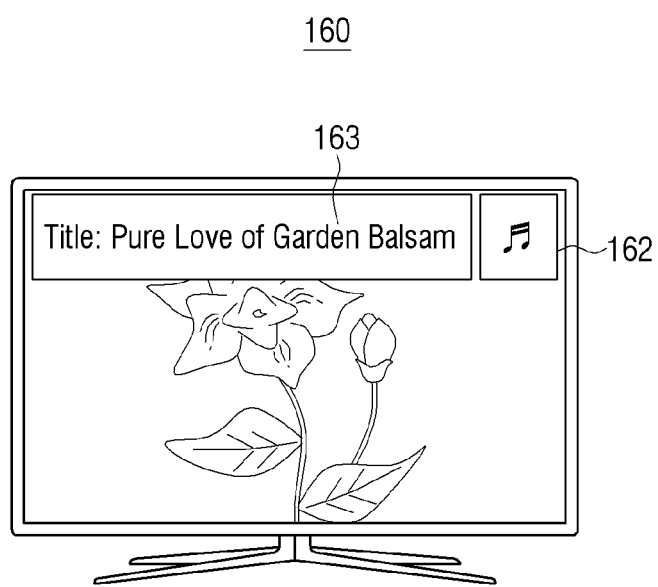

FIG. 13B is a view showing music information which is received from the music recognition server 200 and displayed on the display 160.

Referring to FIG. 13B, in response to the music search mode being turned on by the user, the content processing device 100 may display information indicating that the music search mode is currently in the on state 162, and provides music information to the user through a music search result window 163.

Only the title of the music information is displayed on the music search result window 163. However, this should not be considered as limiting. For example, the title, title of an album on which the music is recorded, producer, composer, lyric writer, singer, replay time, release date, lyrics, and other music information may be additionally displayed.

Figure 13C:
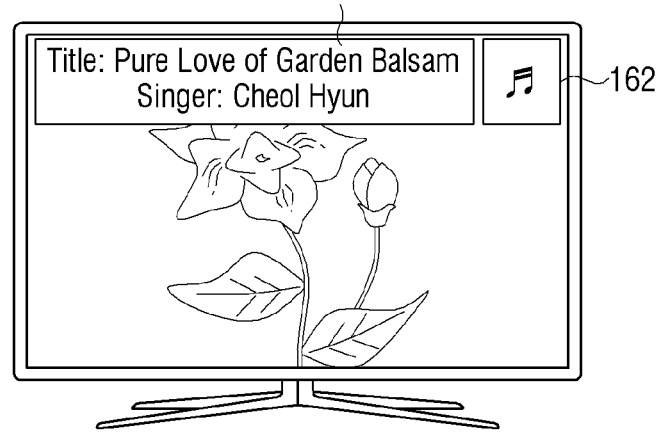
Figure 13C:
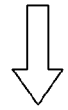
Figure 13C:
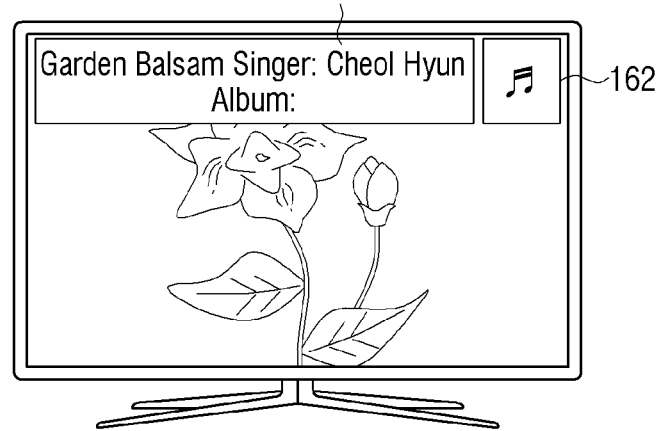

FIG. 13C is a view showing music information which is received from the music recognition server 200 and displayed on the display 160.

Referring to FIG. 13C, the music information (the title, title of an album on which the music is recorded, producer, composer, lyric writer, singer, replay time, release date, lyrics, and other music information) received from the music recognition server 200 may be displayed in such a manner that the music information is moved in the music search result window 132.

Figure 13D:
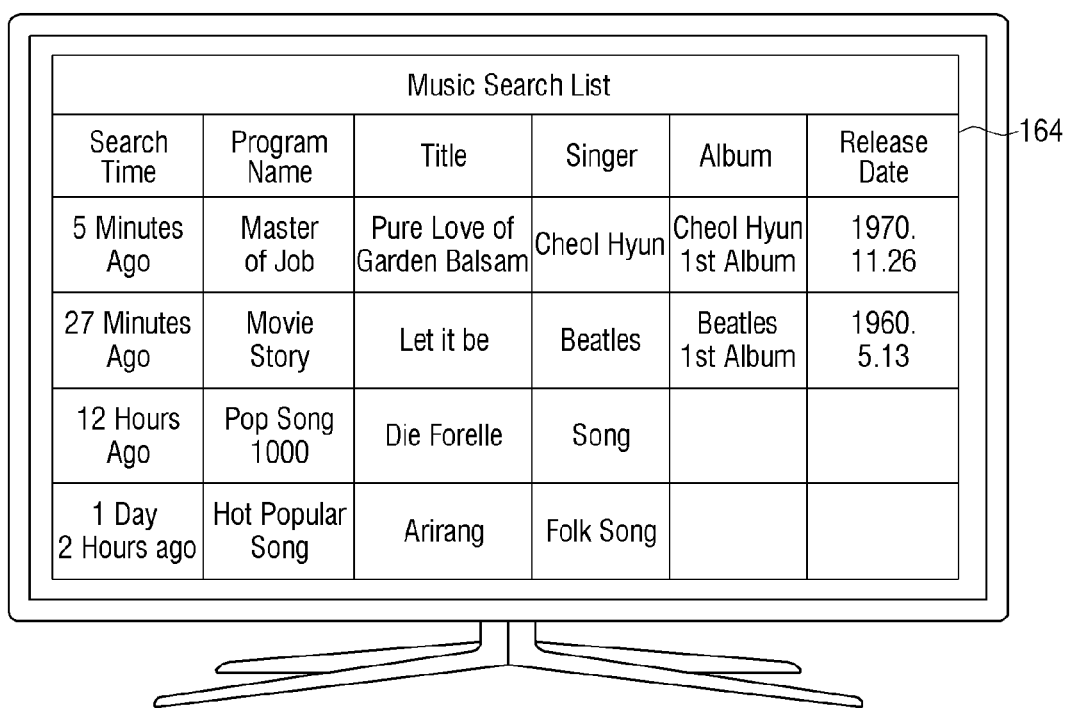

FIG. 13D is a view showing a music information list 164 which is received from the music recognition server 200 and is displayed through the display 160.

Referring to FIG. 13D, the processor 130 may list the music information received from the music recognition server 200 and stores the listed music information in the storage 180, and may display the music search list 164 on the display 160 in response to user manipulation.

The music search list 164 may display time at which the music is reproduced with reference to current time. That is, it can be seen that the respective pieces of music in the music search list 164 of FIG. 13D were reproduced 5 minutes ago, 27 minutes ago, 12 hours ago, and 1 day and 2 hours ago with reference to current time.

In addition, the music search list 164 may display information indicating what program was being broadcasted while music was being reproduced. For example, the song "Pure Love of Garden Balsam" was reproduced while the program "Master of Job" was being broadcasted.

In the present exemplary embodiment, the music search list 164 displays the search time, program names, titles, singers, album titles, and release dates. However, this should not be considered as limiting. That is, the title, album title, producer, composer, lyric writer, singer, replay time, release date, and other music information of the music may be displayed on the music search list 164.

A Graphic User Interface (GUI) generator (not shown) may generate a GUI for the music search list 164, add the GUI to the video signal outputted from the video processor 150, and display the music search list 164 on the display 160 in the form of an image added with the GUI.

Figure 13E:
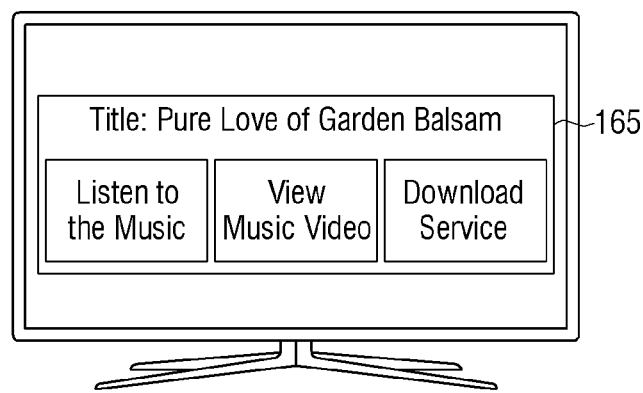

FIG. 13E is a view showing a display screen displayed in response to specific music being selected in the music information list 164.

Referring to FIG. 13E, in response to specific music being selected in the music information list 164, a listen service, a music video view service, a download service, etc. on the music may be provided.

Specifically, the content processing device 100 may receive music from the music recognition server 200 or other content service providers as a streaming service and reproduce the music, or may download music from the music recognition server 200 or other content service providers.

In addition, the content processing device 100 may receive a music video of corresponding music provided by the music recognition server 200 or other content service providers, or a related VOD service.

Although not shown in the drawings, detailed information of music may be displayed on the display 160 in response to the music being selected by the user. That is, a part or entirety of the title, album title, producer, composer, lyric writer, singer, replay time, release date, and other music information of the selected music may be displayed on the display 160.

In the present exemplary embodiment, the music is selected from the listed music list and reproduced after music search is completed. However, this should not be considered as limiting. For example, the searched music may be provided to the user in real time. That is, in response to the music search being completed in response to a user's music search command, the screen of FIG. 13E may be directly provided, so that the user can be provided with the searched music in real time. In response to the music search being completed, the music may be directly reproduced or the music video may be reproduced without displaying the window of FIG. 13E.

Figure 14:
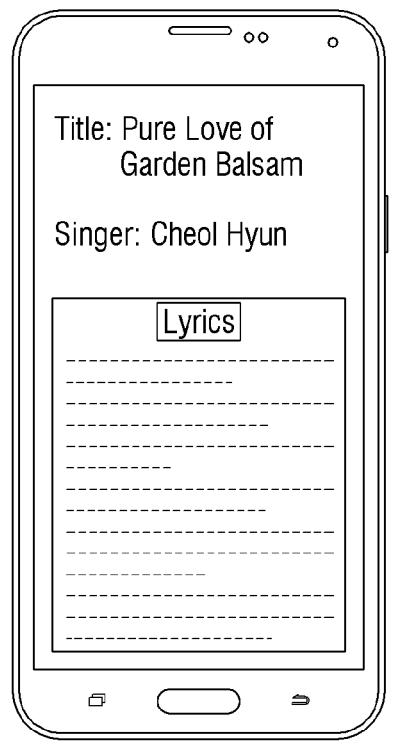
FIG. 14 is a view showing an external device which is connected with a content processing device and displays music information.

FIG. 14 is a view showing an external device which is connected with a content processing device and displays music information on a screen.

The processor 130 may provide music information to the external device 300 and control the external device 300 to reproduce music by communicating with the external device 300 connected with the content processing device 100 through the communicator 140.

The external device 300 may be a device which is connected with the content processing device 100 and communicates therewith through Wireless HDMI, WiFi, Bluetooth, IR Blaster, IrDA, HDMI, USB, etc, and may be a mobile communication terminal, a PC, a Portable Multimedia Player (PMP), a remote controller, a tablet PC, etc. In addition, the external device 300 may be other devices than the content processing device in a home network system which is established through a telephony wire, a wireless LAN, Bluetooth, USB, IEEE 1394, etc.

That is, the processor 130 may provide music information to the external device 300 and control the external device 300 to display the music information (the title, album title, producer, composer, lyric writer, singer, replay time, release date, lyrics, and other music information) on the display of the external device by communicating with the external device 300 connected with the content processing device 100 through the communicator 140.

In addition, the processor 130 may control the external device 300 provided with a music output function to reproduce the music selected by the user.

Figure 15:
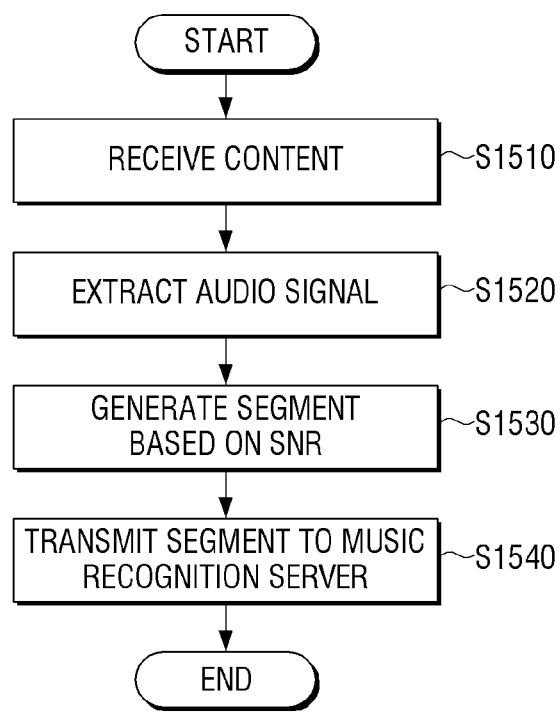
FIG. 15 is a flowchart to explain a content processing method according to an exemplary embodiment.

FIG. 15 is a flowchart to illustrate a content processing method according to an exemplary embodiment.

Referring to FIG. 15, a content is received first (S1510).

An audio signal is extracted by decoding audio data included in the content (S1520).

A characteristic section is determined in the audio signal based on an SNR, and a segment including the characteristic section is detected (S1530). Specifically, the audio signal extracted by the audio processor is received and stored in the form of audio data (PCM), a characteristic section in the audio signal is determined by analyzing the audio data based on the SNR, and a segment including the characteristic section is detected. In this case, the size of the segment may be determined variably within a predetermined threshold range.

The segment may be transmitted to the music recognition server (S1540). Specifically, when a plurality of segments are generated, the segments may be grouped on a basis of a predetermined number and transmitted to the music recognition server in a group basis in phases. In addition, in response to a music recognition failure signal being received from the music recognition server after one segment group has been transmitted to the music recognition server, a subsequent segment group may be transmitted to the music recognition server, and, in response to a music recognition completion signal being received from the music recognition server, the subsequent segment group may not be transmitted.

The method may further include, when the size of the segment is less than a threshold range, combining the segment with a neighboring segment, and, when the size of the segment exceeds the threshold range, dividing the segment into a plurality of pieces.

When the plurality of segments are generated, the plurality of segments may be allocated priority in order of the SNR, and may be transmitted to the music recognition server in sequence according to the priority. In this case, when as many segments as a predetermined number are generated, the priority may be allocated to the generated segments.

The method may further include, in response to music information of music recognized by the segment being transmitted from the music recognition server, storing the music information.

The method may further include displaying the music information.

The above-described content processing method may be implemented by using at least one execution program for executing the above-described content processing method, and the execution program may be stored in a non-transitory computer readable medium.

The non-transitory computer readable medium refers to a medium that stores data semi-permanently rather than storing data for a very short time, such as a register, a cache, a memory or etc., and is readable by an apparatus. Specifically, the above-described programs may be stored in the non-transitory computer readable medium such as a compact disc (CD), a digital versatile disk (DVD), a hard disk, a Blu-ray disk, a universal serial bus (USB), a memory card, a read only memory (ROM) or etc., and may be provided The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A content processing device, comprising:
   a receiver configured to receive a content;
   an audio processor configured to extract an audio signal by decoding audio data included in the content;
   a processor configured to determine a characteristic section in the audio signal based on a ratio of a music signal occupying the audio signal, and generate a segment that includes the characteristic section in the audio signal; and a communicator configured to transmit the generated segment to a music recognition server, a size of the transmitted segment being variably determined within a threshold range, and wherein the processor is configured to combine the segment with a neighboring segment when the size of the segment is determined to be less than the threshold range, and divide the segment into a plurality of pieces when the size of the segment is determined to exceed the threshold range.

2. The content processing device of claim 1, wherein the processor is configured to calculate the ratio of the music signal in the audio signal, determine at least one audio section in which the ratio of the music signal in the audio signal is greater than or equal to a threshold value as the characteristic section, and generate the segment by labeling the characteristic section with a start point and an end point.

3. The content processing device of claim 1, wherein a plurality of segments including the segment are generated, and the processor is configured to group a number of segments among the plurality of segments including the segment and control the communicator to transmit the grouped segments to the music recognition server in an order.

4. The content processing device of claim 3, wherein the plurality of segments including the segment are grouped in segment groups, one of the segment groups is transmitted to the music recognition server, and the processor is configured to transmit a segment group subsequent to the one of the segment groups to the music recognition server in response to a music recognition failure signal being received from the music recognition server through the communicator, and wherein the processor is configured, upon a music recognition completion signal being received from the music recognition server, not to transmit the segment group subsequent to the one of the segment groups.

5. The content processing device of claim 1, further comprising:

a storage configured to, in response to transmission of a music information, store the music information, from the music recognition server, as being recognized according to the transmitted segment; and a display configured to display the music information.

6. The content processing device of claim 1, wherein a plurality of segments are generated, and the processor is configured to allocate priority to the plurality of segments in high order of the ratio of the music signal in the audio signal, and sequentially transmit the plurality of segments to the music recognition server according to the priority.

7. The content processing device of claim 6, wherein the processor is configured to allocate the priority to the plurality of segments in response to the plurality of segments reaching a predetermined number.

8. The content processing device of claim 1, wherein the ratio of the music signal in the audio signal is calculated by the following formula:

Ratio of music in the audio signal=music score/ (noise score+speech score+score of other than music, noise and speech in the audio signal).

9. The content processing device of claim 1, wherein a plurality of segments including the segment are generated, and the plurality of segments are correspondingly labeled with a score based on at least a size of the music signal thereof so that transmission of the plurality of segments including the segment is controlled according to scoring of the plurality of segments including the segment.

10. A method for transmitting a segment of a content processing device, the method comprising:

receiving a content;

extracting an audio signal by decoding audio data included in the content;

determining a characteristic section in the audio signal based on a ratio of a music signal occupying the audio signal, and generating a segment that includes the characteristic section in the audio signal; and transmitting the generated segment to a music recognition server, a size of the transmitted segment being variably determined within a threshold range, wherein the method further comprises:

combining the segment with a neighboring segment when the size of the segment is less than the threshold range, and dividing the segment into a plurality of pieces when the size of the segment exceeds the threshold range.

11. The method of claim 10, wherein the generating the segment comprises calculating the ratio of the music signal in the audio signal, determining at least one audio section in which the ratio of the music signal in the audio signal is greater than or equal to a threshold value as the characteristic section, and generating the segment by labeling the characteristic section with a start point and an end point.

12. The method of claim 10, wherein a plurality of segments including the segment are generated, and the transmitting of the segment to the music recognition server comprises:

grouping a number of segments among the plurality of segments including the segment and transmitting the grouped segments to the music recognition server in an order.

13. The method of claim 12, wherein the plurality of segments including the segment are grouped in segment groups, and the transmitting the segment to the music recognition server comprises, after having transmitted one segment groups to the music recognition server, transmitting a segment subsequent to the one of the segment groups to the music recognitions server in response to a music recognition failure signal being received from the music recognition server, and the segment group subsequent to the one of the segment groups not being transmitted upon a music recognition completion signal being received from the music recognition server.

14. The method of claim 10, further comprising:

in response to transmission of a music information, storing the music information, from the music recognition server, as being recognized according to the transmitted segment; and displaying the music information.

15. The method of claim 10, wherein a plurality of segments are generated, and the method further comprises:

allocating priority to the plurality of segments in high order of the ratio of the music signal in the audio signal, wherein the transmitting comprises sequentially transmitting the plurality of segments to the music recognition server according to the priority.

16. The method of claim 15, wherein the allocating of the priority comprises allocating the priority to the generated segments in response to the plurality of segments reaching a predetermined number.

17. The method of claim 10, wherein the ratio of the music signal in the audio signal is calculated by the following formula:

Ratio of music in the audio signal=music score/
(noise score+speech score+score of other than
music, noise and speech in the audio signal).

18. A computer program which is stored in a non-transitory recording medium to cause a content processing device to execute an operation, comprising:
receiving a content;
extracting an audio signal by decoding audio data included in the content;
determining a characteristic section in the audio signal based on a ratio of a music signal occupying the audio signal, and generating a segment that includes the characteristic section in the audio signal; and
transmitting the generated segment to a music recognition server, a size of the transmitted segment being variably determined within a threshold range,
wherein the operation further comprises:
combining the segment with a neighboring segment when the size of the segment is less than the threshold range, and dividing the segment into a plurality of pieces when the size of the segment exceeds the threshold range.

19. A content processing method, comprising:
generating at least one segment occupying an audio signal to have a variable size within a range, the at least one segment generated being determined to have a ratio of a music signal relative to other remaining information of the audio signal which is over a threshold; and
transmitting the at least one segment of the variable size within the range so as to perform music recognition,
wherein the content processing method further comprises:
combining the at least one segment with a neighboring segment when the variable size of the at least one segment is less than the threshold, and dividing the at least one segment into a plurality of pieces when the variable size of the at least one segment exceeds the threshold.

* * * * *